US007568156B1

(12) United States Patent
Fischer et al.

(10) Patent No.: US 7,568,156 B1
(45) Date of Patent: Jul. 28, 2009

(54) LANGUAGE RENDERING

(75) Inventors: Wolfgang Fischer, Grunwald (DE); Matt Buchman, Seattle, WA (US); Thomas Dixon Hutchinson, Boulder, CO (US); Mayank Joshi, Santa Clara, CA (US); Scott Lee, Bellevue, WA (US); Tom Pohorsky, Soquel, CA (US); Merlinda Poon, Ottawa (CA); Bala Vijayakumar, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 539 days.

(21) Appl. No.: 11/054,331

(22) Filed: Feb. 8, 2005

(51) Int. Cl.
*G06F 17/00* (2006.01)

(52) U.S. Cl. ....................................... 715/256; 715/255

(58) Field of Classification Search ................. 715/500, 715/511, 524, 530, 531, 200, 229, 250, 255, 715/256

See application file for complete search history.

(56) References Cited

U.S. PATENT DOCUMENTS 5,655,148 A 8/1997 Richman et al.
5,870,084 A * 2/1999 Kanungo et al. ............ 345/551
6,041,345 A 3/2000 Levi et al.
6,829,620 B2 * 12/2004 Hsing et al. .............. 707/104.1
6,999,082 B2 * 2/2006 Nishimura .................. 345/467
7,013,469 B2 * 3/2006 Smith et al. ................. 719/328
7,017,162 B2 * 3/2006 Smith et al. ................. 719/328
7,032,227 B2 4/2006 Wilkinson et al.
7,086,004 B2 * 8/2006 Atkin ......................... 715/531
7,165,260 B2 1/2007 Blaser et al.
7,286,815 B2 10/2007 Coppinger et al.
2001/0029542 A1 * 10/2001 Nishimura .................. 709/231
2003/0023590 A1 * 1/2003 Atkin ........................... 707/6
2004/0030781 A1 * 2/2004 Etesse et al. ................ 709/225
2004/0268305 A1 * 12/2004 Hogg et al. ................. 717/109
2005/0246716 A1 * 11/2005 Smith et al. ................. 719/315
2006/0179350 A1 * 8/2006 Nathan et al. ................ 714/38

OTHER PUBLICATIONS

Wikipedia, Unicode, retrieved on Jan. 6, 2008 from the Internet, Published by Wikipedia, pp. 1-12.*
Wikipedia, UTF8, retrieved on Jan. 6, 2008 from the Internet, Published by Wikipedia, pp. 1-11.*
Wissink, Unicode and Window XP, 18th International Unicode Conference, Apr. 1, 2001, pp. 1-15.

* cited by examiner

*Primary Examiner*—Stephen S Hong
*Assistant Examiner*—Gregory J Vaughn
(74) *Attorney, Agent, or Firm*—Van Pelt, Yi & James LLP

(57) ABSTRACT

In some embodiments, a technique for processing a character comprises receiving a character; determining whether the character is in a predetermined language; transforming the character to a symbol associated with a private area of Unicode if it is determined that the character is not in the predetermined language; and storing a result of the transformation.

19 Claims, 4 Drawing Sheets

LANGUAGE RENDERING

FIELD OF THE INVENTION

The present invention relates generally to electronic information, more specifically, to storage and rendering of such information.

BACKGROUND OF THE INVENTION

Storage and rendering of characters in non-English languages are often managed by a program designed to handle that particular language. For example, a Chinese backup program may be a program designed to specifically process Chinese characters. However, it is becoming more common to store and render text in multiple languages within a single software program. It is also more common for international companies to deal with multiple languages within their network. A potential problem with language-specific software is that the rendering of the stored text may sometimes be nonsensical due to different formats associated with different operating systems. It would be desirable to be able to store and render text in a manner that is language-independent and file-system independent.

BRIEF DESCRIPTION OF THE DRAWINGS

Various embodiments of the invention are disclosed in the following detailed description and the accompanying drawings.

DETAILED DISCLOSURE

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
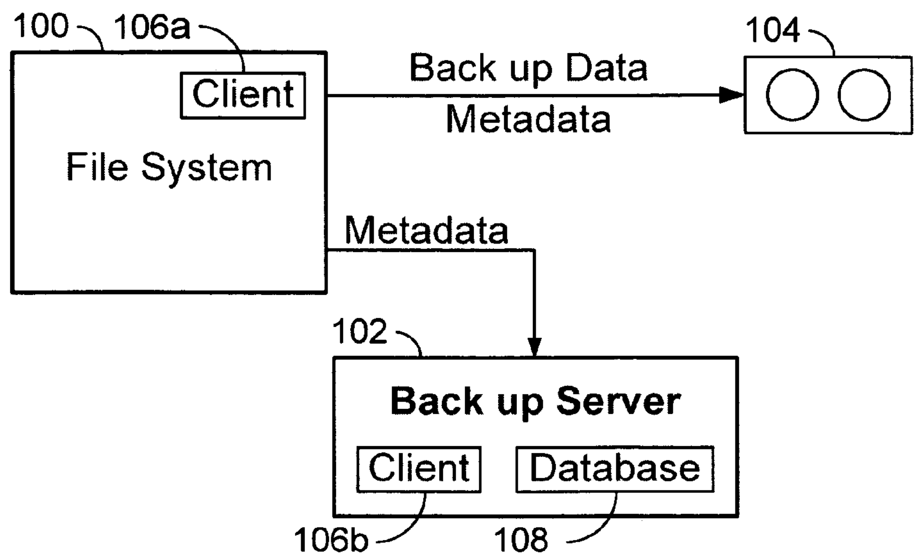
FIG. 1 is a block diagram of a system suitable for executing methods for storing and rendering characters in some embodiments.

FIG. 1 is a block diagram of a system suitable for executing methods for storing and rendering characters in some embodiments. In this example, a backup client 106*a* running on an operating system, such as Linux or Windows, is shown to backup the file system 100 data on a backup medium 104. An example of a file system data is a file on a NTFS file system on Windows. Examples of backup media include tape drives, hard disks, and portable media. The backup client 106*a* is also shown to send information, such as metadata, to backup server 102. An example of a backup server is EMC's Networker. In this example, the storage and retrieval of characters can be performed by software modules 106A-106B, such as a backup client, that can be located in any of the hardware components. An example of a backup client is EMC's Networker Client.

Although the example shown in FIG. 1 is shown for a backup system, the methods described in conjunction with the remaining figures can be performed on any system that can store or render a character.

Figure 2:
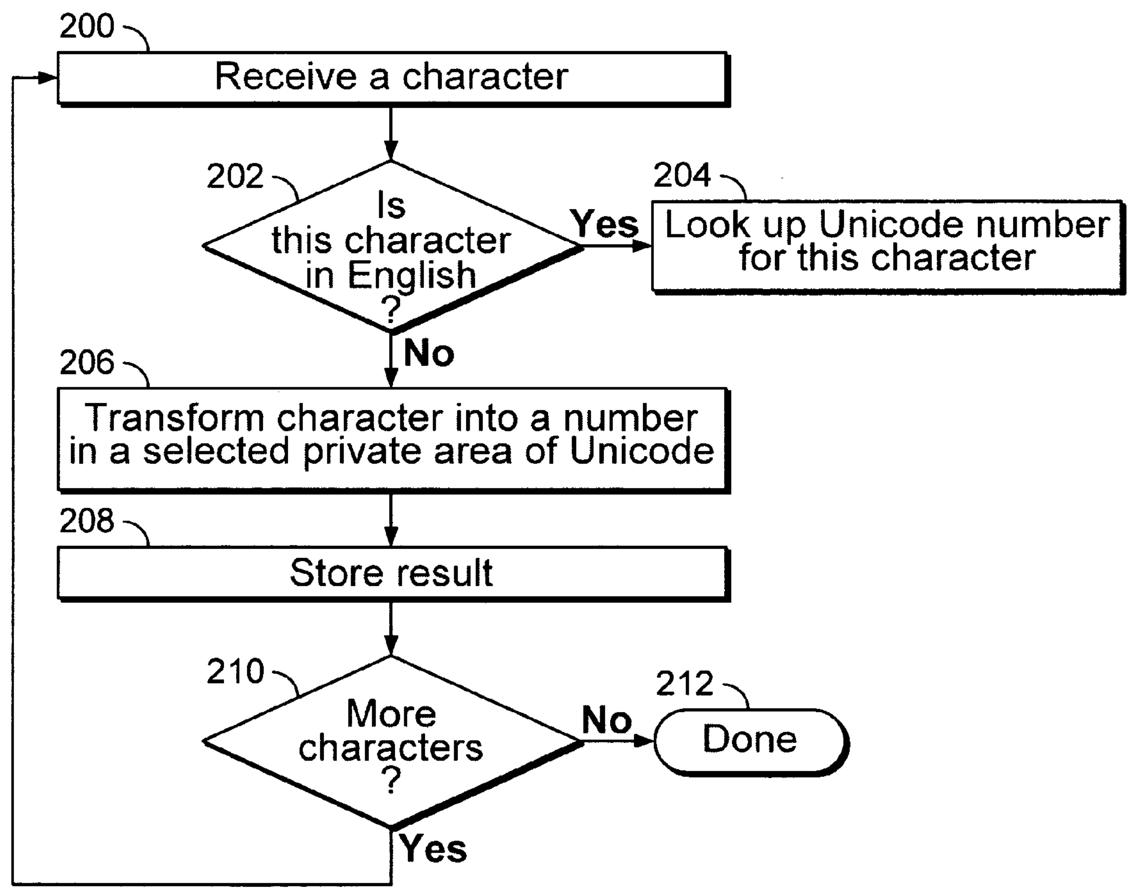
FIG. 2 is a flow diagram of a method for storing a character according to some embodiments.

FIG. 2 is a flow diagram of a method for storing a character according to some embodiments. In this example, a character is received (200). For example, a Hindi character is received for storage, such as for backup purposes. It is then determined whether this character is in English (202). Further details of how to determine whether a character is in English will later be discussed in conjunction with FIGS. 3 and 4.

If the received character is in English, a character set standard, such as Unicode, is looked up to convert the character to a number (204). Unicode is a standard that can be used to convert a character to a number. Unicode set includes characters from many languages. The conversion of an English character to a Unicode number is well known.

If the received character is not in English (202), then the character is transformed into a number in a selected private area of Unicode (206) in this example. The Unicode standard includes sections reserved for private use. One of these sections can be selected for use in associating the numbers in that section with received characters. Further details of transforming a character into a number in the selected private area of Unicode are later discussed in conjunction with FIG. 3.

The result of the transformation is stored (208). For example, the result can be stored in database 108 of FIG. 1. If there are more characters (210), then another character is received (200) and it is determined whether this new character is in English (202). If there are no more characters (210), then the process of storing the characters is finished (212).

Figure 3:
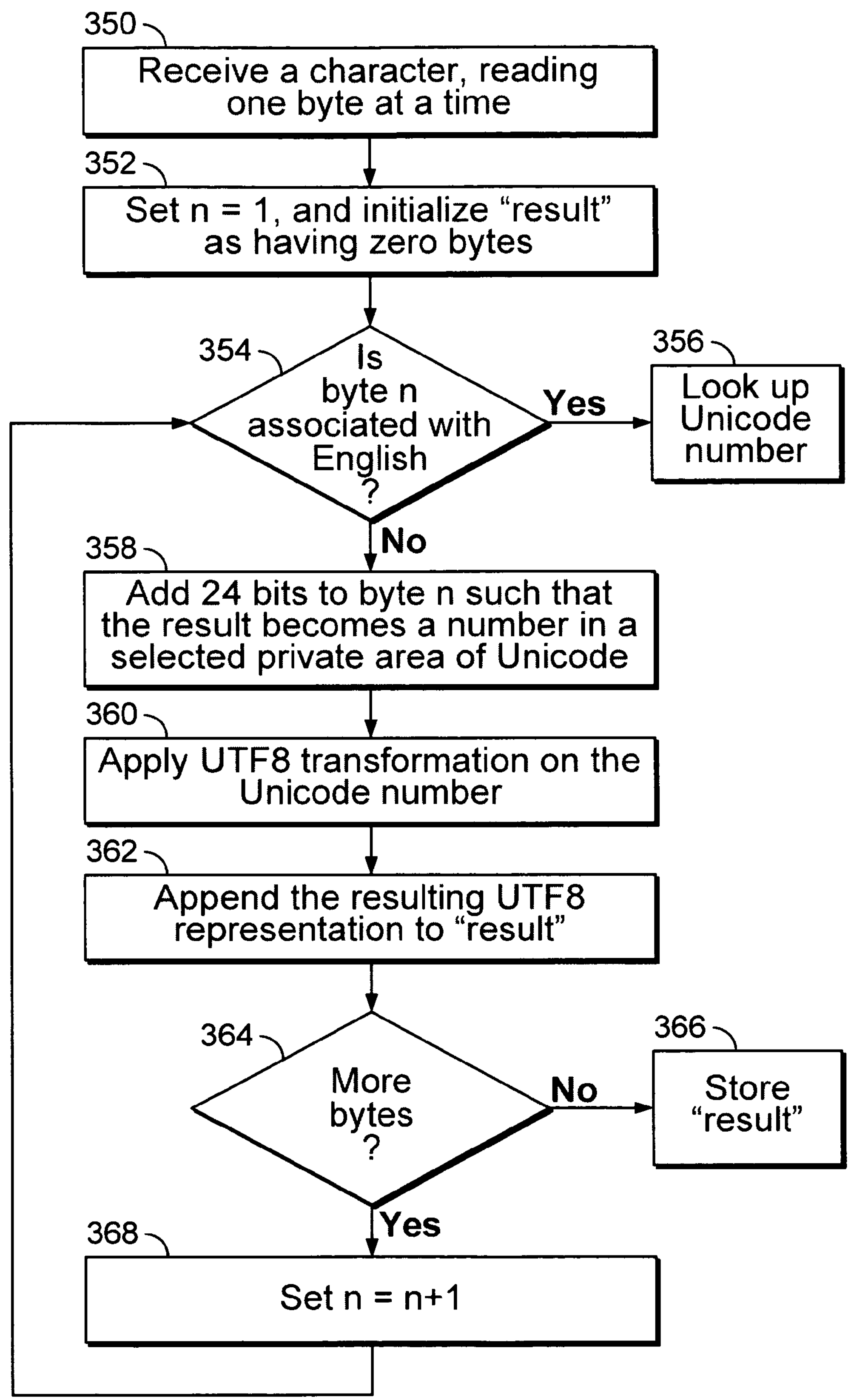
FIG. 3 is another flow diagram of method for storing a character according to some embodiments.
Figure 4:
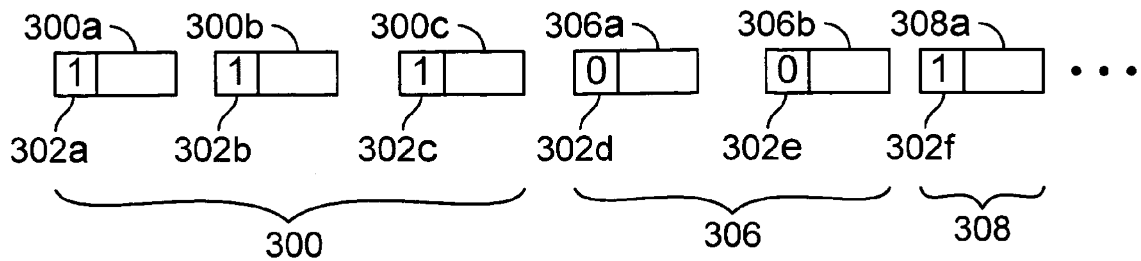
FIG. 4 is an example of bytes representing characters according to some embodiments.

FIG. 3 is another flow diagram of a method for storing a character according to some embodiments. The example shown in FIG. 3 can be better understood when viewed in conjunction with FIG. 4. FIG. 4 is an example of bytes representing characters according to some embodiments.

In the example shown in FIG. 3, a character is received, and read one byte at a time (350). N is set to equal to 1, and "Result" is initialized as having zero bytes (352). It is then determined whether byte N is associated with English (354).

In the example shown in FIG. 4, a character 300 is shown to include bytes 300A-300C. Assume that byte 300A is being processed. In some embodiments, byte 300A can be determined whether it is English by looking at the most significant bit (MSB) 302A. If the MSB is set to equal zero, then the byte is in a language that is not English. If the MSB is set to equal 1, such as MSB 302D-302E of character of 306, then that byte is in English. In some embodiments, one of the numbers may mean any preselected language while the other number may mean a non-preselected language. For example, if the preselected language is French, MSB of 1 may indicate French, while zero indicates non-French.

Returning to FIG. 3, if byte N is associated with English (354), then the corresponding Unicode number for that character is looked up (356). In some embodiments, if the character is associated with English, then there is a single byte for that character and the Unicode can be looked up.

If byte N is not associated with English, then additional bits are added to byte N such that the result becomes a number in a selected private area of Unicode (358). Unicode has several private areas reserved for private uses. An example of a private area use is to transform a local language, such as one of the local languages in India, to a numerical code by a company wishing to release a product in that area. A Unicode private area may be a block of reserved numbers within Unicode. According to some embodiments, a Unicode private area may be selected for use in storing characters, such as non-English characters. For example, 24 bits can be added to byte N to result in a number that falls within the selected private area of Unicode. This selected private area can be predetermined among the several private areas reserved in Unicode. The 24 bits to be added to byte N can be selected to result in a number that falls within the private area. For example, for the byte 0xe8, 0x0000F800 is prepended to it to result in 0x0000F8e8 which is a number in a private area. In some embodiments, the same 24 bits can be used for all the bytes being processed so long as the resulting number falls within the selected private area.

UTF8 transformation may be applied on the resulting Unicode number (360). UTF8 transformations on Unicode numbers are well known Unicode transformation formats. The resulting UTF8 representation may be appended to "Result" (362). If there are more bytes to be processed (364), then N is set to N+1 (368). It is then determined whether byte N is associated with English (354), and byte N is processed as described above. If there are no more bytes (364), then "Result" is stored (366).

Figure 5:
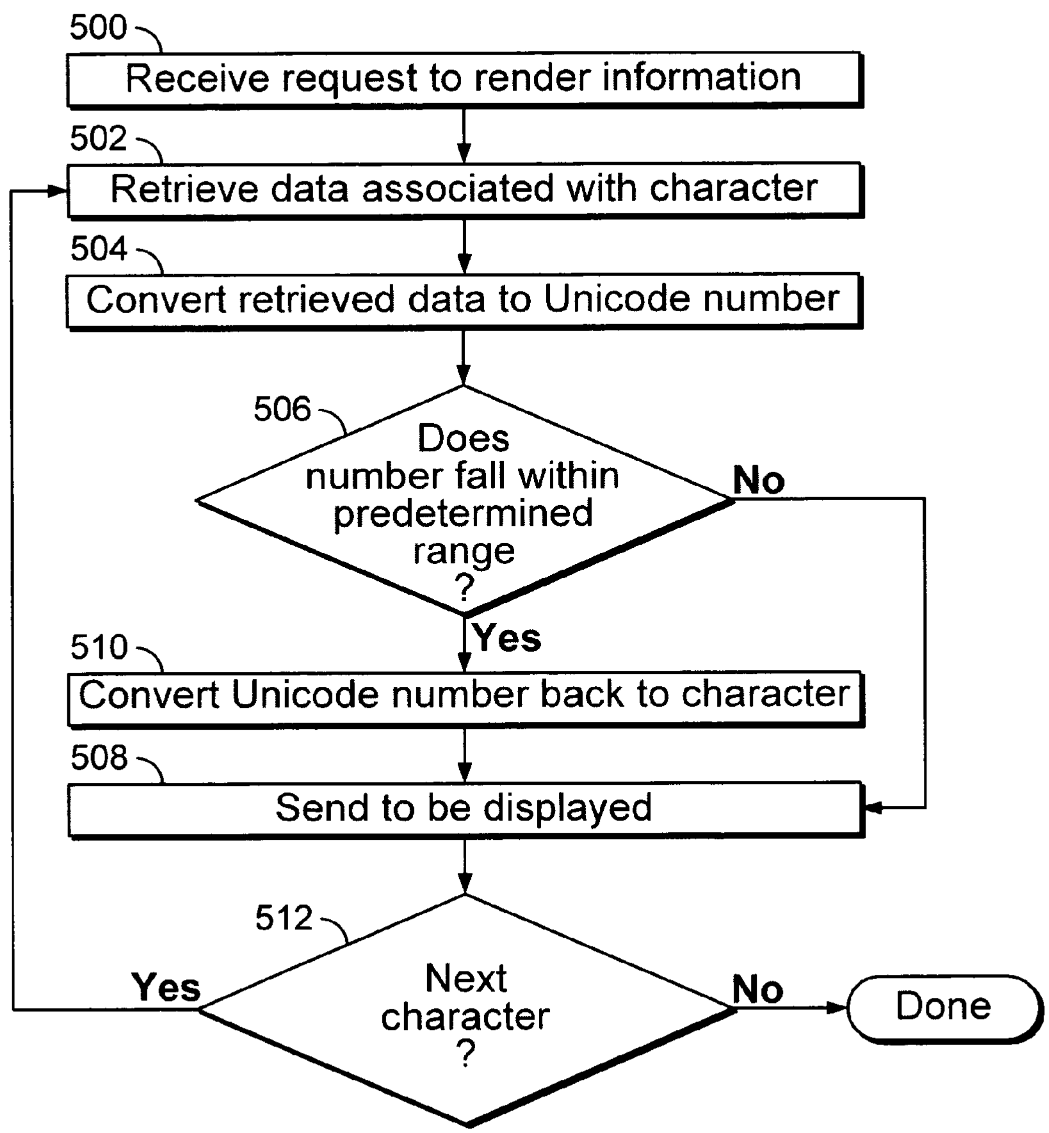
FIG. 5 is a flow diagram of a method for rendering a character according to some embodiments.

FIG. 5 is a flow diagram of a method for rendering a character according to some embodiments. In this example, a request to render information is received (500). Data associated with the character requested to be rendered may be retrieved (502). The retrieved data may be converted to a Unicode number (504). For example, if the data is stored in a format resulting from UTF8 transformation, a reversed UTF8 transformation may be performed to convert the data back to a Unicode number. How to perform a reverse UTF8 transformation is well known.

It is then determined whether the Unicode number falls within a predetermined range (506). For example, it is determined whether the Unicode number falls within a range of a pre-selected private area of the Unicode Standard. If it does not fall within the predetermined range, then the Unicode number is sent to be displayed as a character (508). For example, if the character is an English character, than the Unicode number associated with that character will not fall in the selected private area of Unicode in some embodiments, and can be displayed directly as that character.

If, however, the Unicode number does fall within the predetermined range (506), then it may be converted back to a non-English character (510). The non-English character is then sent to be displayed (508).

If there are no more characters (512), then the rendering is complete. If, however, there are more characters, then data associated with that character is retrieved (502) and the process described above is performed on the new character.

Figure 6:
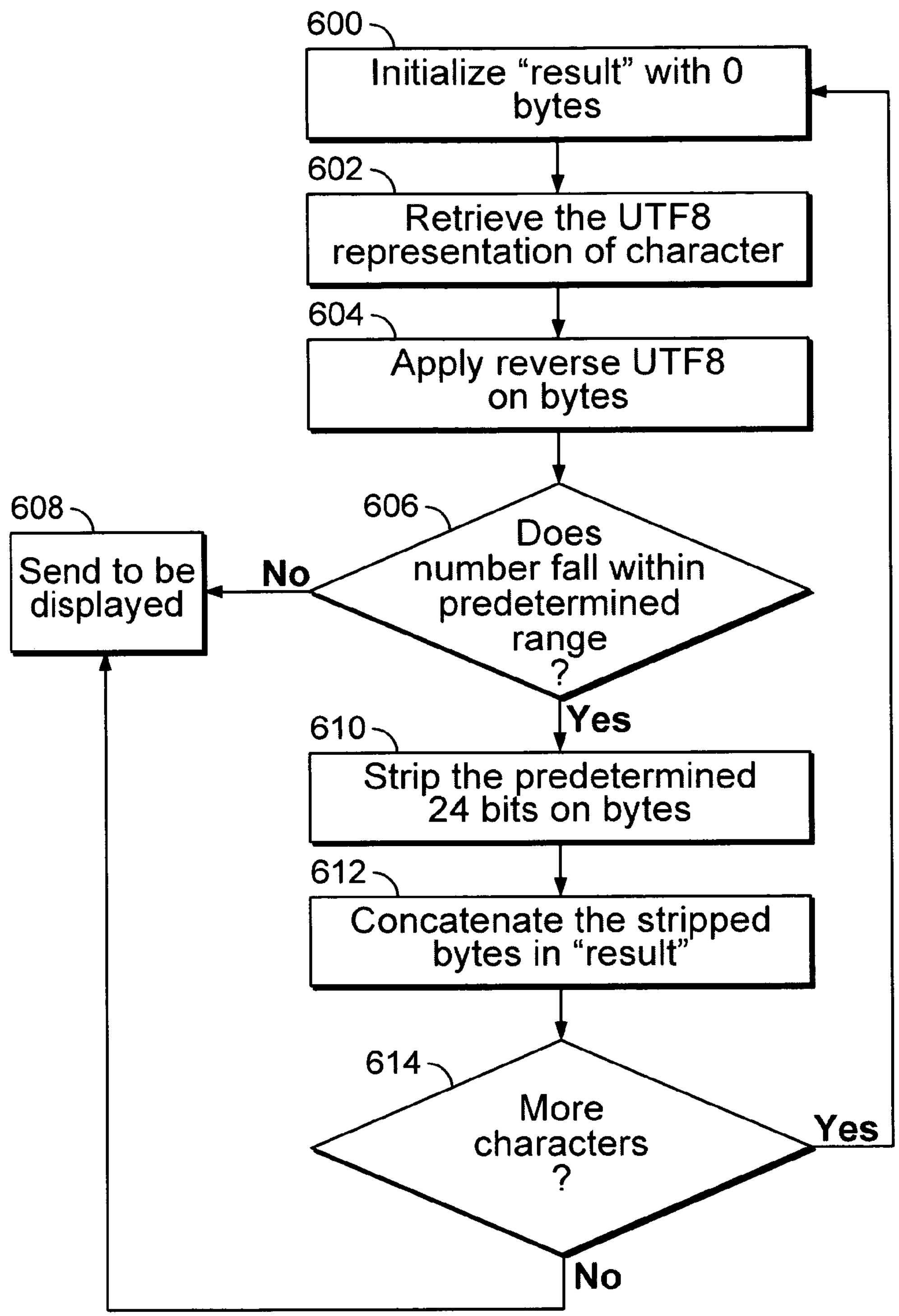
FIG. 6 is another flow diagram of a method for rendering a character according to some embodiments.

FIG. 6 is another flow diagram of a method for rendering a character according to some embodiments. In this example, "Result" is initialized with zero bytes (600). The UTF8 representation of the character may be retrieved from storage (608). A reverse UTF8 transformation may be applied on the bytes representing the character (604). It is determined whether the number falls within a predetermined range of Unicode (606). If the number resulting from the reverse UTF8 transformation does not fall within the predetermined range, than the number is sent to be displayed (608).

If the number falls within the predetermined range, than the predetermined 24 bits is stripped from the retrieved bytes (610). In some embodiments, the predetermined 24 bits are the bits that were previously added to the bytes in the example shown in FIG. 3. The stripped bytes may be concatenated in "Result" (612). If there are more characters (614), then the UTF8 representation of that character is retrieved (602), and the process described above is applied to the new character. If there are no more characters (614), then the "Result" is sent to be displayed (608).

Although Unicode is used herein as an example, any language conversion standard may be used. Likewise, although UTF8 is used herein as an example, any format that can be used to store character representation can be used. Examples of such format are UTF-16 and UTF-32.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing a character comprising:

receiving a value corresponding to a character;

determining whether the character is associated with a predetermined language based at least in part on the received value;

transforming the value corresponding to the character into a transformed value that falls within a private area of Unicode if it is determined that the value corresponding to the character is not associated with the predetermined language;

transforming the value corresponding to the character into a transformed value that falls outside of the private area of Unicode if it is determined that the value corresponding to the character is associated with the predetermined language; and storing a result of the transformation.

2. The method of claim 1, wherein the predetermined language is English.

3. The method of claim 1, wherein the symbol is a number.

4. The method of claim 1, wherein transforming includes adding a predetermined number of bits to a byte, wherein the byte is associated with the character.

5. The method of claim 4, wherein the predetermined number of bits is 24.

6. The method of claim 1, further comprising applying a UTF8 transformation on the Unicode symbol, wherein storing the result of the transformation includes storing the output of the UTF8 transformation.

7. The method of claim 1, wherein:

determining includes checking the most significant bit (MSB) of a byte;

the byte is associated with the character;

in the event the MSB of the byte is a first value, it is determined that the character is associated with the predetermined language; and in the event the MSB of the byte is a second value, it is determined that the character is not associated with the predetermined language.

8. The method of claim 1, further comprising:

retrieving the stored result;

converting the retrieved stored result into a Unicode value; and determining whether the Unicode value falls within the private area.

9. The method of claim 8, wherein converting the retrieved stored result includes applying a reverse UTF8 on a byte, wherein the byte is associated with the retrieved stored result.

10. The method of claim 9, further comprising concatenating the stripped byte with a second stripped byte, wherein the second stripped byte is also associated with the retrieved stored result.

11. The method of claim 8, wherein determining whether the Unicode value falls within the private area includes determining whether a Unicode number falls within a predetermined range.

12. The method of claim 8, further comprising stripping a predetermined number of bits from a byte, wherein the byte is associated with the retrieved stored result.

13. A method for processing a character comprising:

retrieving a stored result;

converting the retrieved stored result into a Unicode value;

determining whether the Unicode value falls within a predetermined private area of Unicode;

if it is determined that the Unicode value falls within the predetermined private area of Unicode:

performing an inverse transform on the Unicode value to obtain a second value; and outputting the second value; and if it is determined that the Unicode value does not fall within the predetermined private area, outputting the Unicode value.

14. The method of claim 13, wherein converting the retrieved stored result includes applying a reverse UTF8 on a byte, wherein the byte is associated with the retrieved stored result.

15. The method of claim 13, wherein determining includes determining whether a Unicode number falls within a predetermined range.

16. The method of claim 13, further comprising stripping a predetermined number of bits from a byte, wherein the byte is associated with the retrieved stored result.

17. The method of claim 16, further comprising concatenating the stripped byte with a second stripped byte, wherein the second stripped byte is also associated with the retrieved stored result.

18. A system for processing a character comprising:

a processor configured to:

receive a value corresponding to a character;

determine whether the character is associated with a predetermined language based at least in part on the received value;

transform the value corresponding to the character into a transformed value that falls within a private area of Unicode if it is determined that the value corresponding to the character is not associated with the predetermined language;

transform the value corresponding to the character into a transformed value that falls outside of the private area of Unicode if it is determined that the value corresponding to the character is associated with the predetermined language; and store a result of the transformation; and a memory coupled to the processor, wherein the memory provides the processor with instructions.

19. A computer program product for processing a character, the computer program product being embodied in a computer readable medium and comprising computer instructions for:

receiving a value corresponding to a character;

determining whether the character is associated with a predetermined language based at least in part on the received value;

transforming the value corresponding to the character into a transformed value that falls within a private area of Unicode if it is determined that the value corresponding to the character is not associated with the predetermined language;

transforming the value corresponding to the character into a transformed value that falls outside of the private area of Unicode if it is determined that the value corresponding to the character is associated with the predetermined language; and storing a result of the transformation.

* * * * *